Patented Nov. 27, 1928.

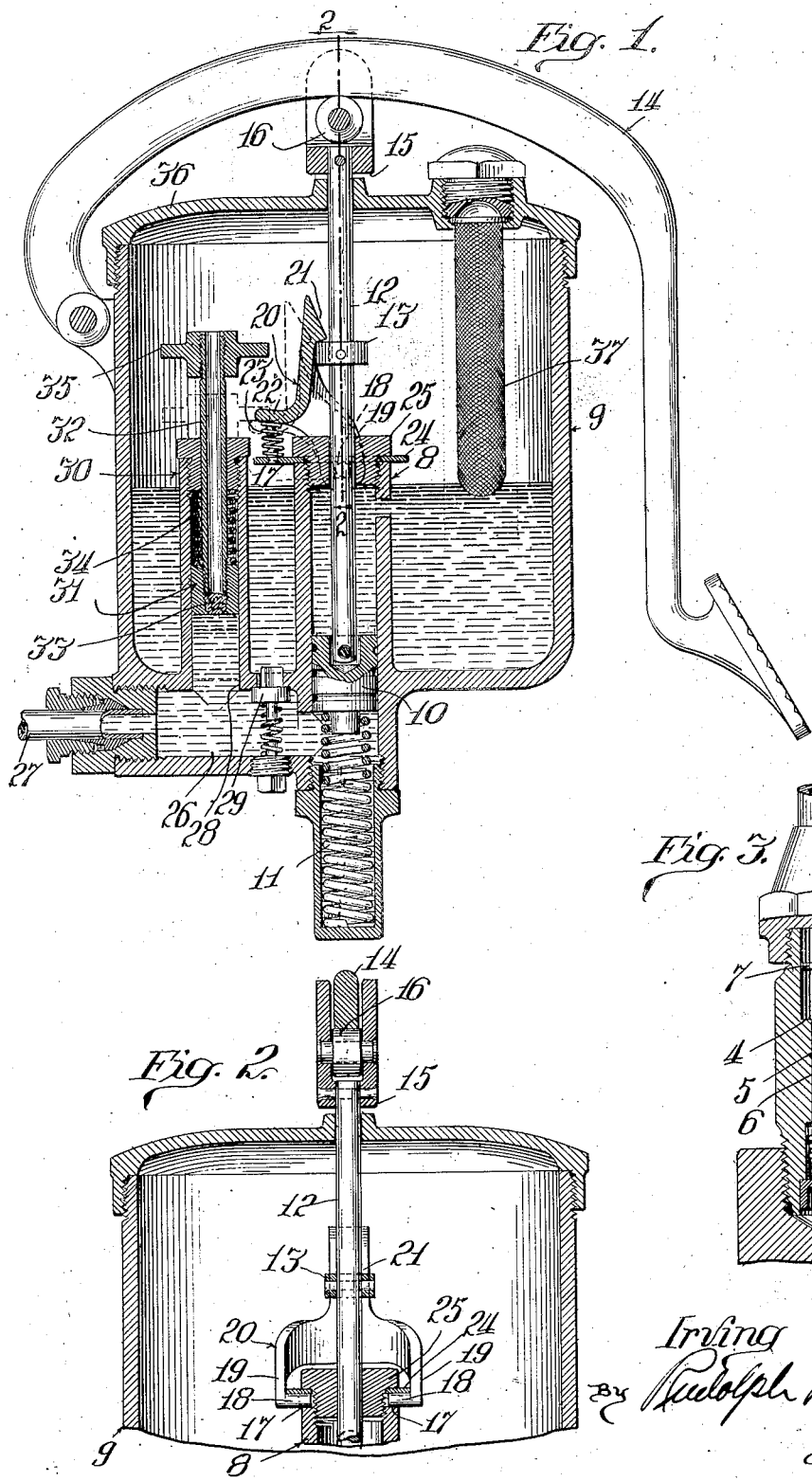

1,693,068

UNITED STATES PATENT OFFICE.

IRVING COWLES, OF CHICAGO, ILLINOIS, ASSIGNOR TO UNION BANK OF CHICAGO, TRUSTEE, OF CHICAGO, ILLINOIS, A CORPORATION OF ILLINOIS.

PUMP FOR LUBRICATING SYSTEMS.

Application filed November 3, 1927. Serial No. 230,740.

This invention relates to improvements in pumps for lubrication systems and particularly for force-feed systems of the type wherein flow to the various bearings, etc. to be lubricated is automatically shut off following discharge of some lubricant to each of said bearings.

In the last-mentioned type of lubricating systems, the shut off devices controlling flow to the bearings, etc. are fluid pressure responsive and self-restoring, become recharged with lubricant after each discharge upon relief of pressure on the newly entered lubricant. It is desirable that this recharge should occur very shortly after discharge so that upon a succeeding operation of the pump, after a time interval, a full discharge to each bearing, etc. will occur. Owing to differences in viscosity of lubricant under variations in temperature, the time required for self-restoring of the devices at the bearings, etc. will vary greatly.

Another feature of this type of system is that flow to tight bearings will not be shut off nor full charges of lubricant delivered into the same as in the case of normal or loose bearings. As it is desirable to favor the tight bearings, it is advantageous to maintain pressure on the lubricant for an appreciable time interval during which, however, flow to the other bearings remains shut off.

The present invention has, therefore, for its objects, to provide a pump which will, at each operation, force the lubricant under a pressure the maximum of which is fixed, and will maintain said pressure for a time interval sufficient to insure ample flow to tight bearings and then automatically relieve pressure so as to permit self-restoring of the devices at the bearings, etc. a further object being to provide a pump the piston of which is urged on its suction stroke by a spring which will permit slow flow of viscous lubricant into the pump cylinder; to provide a pump which permits of discharge of air from the system and the return or surplus oil to the reservoir and which, furthermore, is simple in construction and, therefore, inexpensive to manufacture.

A suitable embodiment of the invention is illustrated in the accompanying drawings, wherein:

Figure 1 is a central vertical section of a pump constructed in accordance with my invention.

Figure 2 is a fragmentary detail vertical section on the line 2—2 of Figure 1.

Figure 3 is a sectional view of one of the devices disposed at an outlet for lubricant to control flow of the latter to a bearing or the like.

In order that the several functions of the pump may be fully understood it is necessary that it be also understood that the pump is connected by suitable piping to a number of bearings, etc. These are usually of different sizes and, according to size and other conditions such as speed of rotation of shafts journalled therein and loads on such shafts, require different charges by weight or volume at intervals, the frequency of the latter being determined by approximate rate of consumption. At each point to be fed with lubricant there is provided a device such as shown in Figure 3, for example, comprising a casing 1 having an intake port at one end connected with the supply piping, and a discharge port at its other end which is controlled by the spring-held check-valve 2. In the intake end portion of the casing 1 there is provided a cylindrical bore 3 terminating in a valve-seat 4 disposed at the upper end of the check-valve controlled discharge duct 5. In the latter I provide a relatively light spring 6 which rests upon the check-valve and supports a piston valve 7 which is of sufficiently smaller diameter than the bore 3 to permit lubricant to pass the same. The check-valve spring is sufficiently strong to overcome the maximum pressure exerted by the spring 6.

The casing 1 is normally full of lubricant, the check-valve being seated and the piston valve at the upper limit of its movement as shown. Upon a pressure stroke of the pump, lubricant is delivered under pressure and velocity sufficient to overcome the check-valve spring and force the piston valve down to the seat 4. During this travel of the piston valve a substantially accurate volume of lubricant, constituting part of the total normally contained in the casing 1, will be discharged and thereupon flow will be shut off and will so remain until the pump pressure is relieved. In the case of tight bearings, however, resistance to discharge will defeat the requisite velocity of flow to permit the piston valve to move to its seat. Consequently, if pump pressure is too soon relieved the tight bearing will receive very little lubricant while its needs may exceed that of a normal bearing. So long as pressure is maintained, there will be flow to the tight bearing.

The pump of this invention comprises the pump cylinder 8, preferably disposed within the oil reservoir 9 and equipped with a reciprocatory piston 10 normally held at the end of its suction stroke by the spring 11. Said piston is equipped with a stem 12 provided between its ends with a collar 13 and engaged at its upper end with a lever 14 which is pivotally secured to the reservoir 9 and may be hand or foot operated. Said stem 12 carries the bifurcated head 15 equipped with a roller 16 on which the lever 14 bears.

In the upper end of the cylinder 8 are a pair of diametrically opposed recesses 17 to receive the trunnions 18 of the yoke 19 of the trip-lever 20 which is equipped with a projection 21 to engage the collar 13 and with a trip projection 22. The latter is engaged by the spring 23 resting on a projection of a washer 24 clamped upon the end of cylinder 8 by means of the nut 25 through which the stem 12 passes.

At its discharge end the cylinder 8 communicates with a chamber 26 from one end of which lubricant is discharged into pipe 27 leading to the casings 1. In the upper wall of the chamber 26 is the suction port 28 controlled by the spring-held valve 29. A cylinder 30 parallel with cylinder 8 opens at its lower end into said chamber 26 and receives oil delivered into the latter in excess of the aggregate amount fed from the casings 1 at each pressure stroke of the piston 10. In cylinder 30 I provide a piston 31 which is hollow and equipped with a hollow stem 32, a filter plug 33 of felt or the like being disposed in the piston 31 so that all fluid escaping from chamber 26 after shut off of flow from casings 1 must pass through said plug. A spring 34 maintains the piston 31 normally at the lower limit of its movement and is adapted to exert a force on the piston sufficient to maintain a pressure far in excess of what is required to overcome the check-valves 2. At the upper end of the stem 32, I provide a trip-head 35 which is adapted to engage the trip projection 22 of the trip-lever 20 to disengage the projection 21 from the collar 13.

In operation, the lever 14 is thrown to the position shown in Figure 1 where it is retained by the trip-lever 20. During this movement of the lever and the consequent discharge stroke of the piston 10, the lubricant will have been subjected to the maximum pressure fixed or limited by the spring 34 of piston 31 and discharge to the bearings from casings 1 will have taken place and the surplus oil forced into the cylinder 30 to thereby force up piston 31. As all oil in excess of the initial discharge from casings 1 must escape and can escape only very slowly through the filter plug 33 and possibly, in part to a tight bearing, the piston 31 will slowly move downwardly while maintaining the high pressure until the head 35 trips the lever 20. As the moment of release of the stem 12, the suction stroke of the piston 10 relieves the pressure and opens the valve 29.

It will be noted that the outlet to pipe 27 is considerably below the bottom of cylinder 30 so that any air finding its way into the chamber 26 will pass out through the filter plug instead of passing into the pipe 27.

The level of oil in the reservoir may be as high as desired above the trip-lever 20. A loose fit between the stem 12 and the opening in the cover 36 will provide an air vent. Oil fed to the reservoir will be filtered through the screen 37.

Obviously the specific relative arrangement of parts shown and described may be changed and varied to adapt the same for various installations and uses without departing from the invention as defined in the appended claims.

The spring 34 is of such greater length than the space in which it is confined as to be under partial compression when the piston 31 is at the lower limit of its movement so that a given minimum pressure on the oil sufficient to overcome the spring 6 will be required to move the piston 31 against said spring 34. Similarly, the spring 11 must be of such length that when the piston 10 is at the upper limit of its movement, said spring 11 exerts a pressure equal approximately to a fluid pressure of ten to twelve pounds per square inch.

I claim as my invention:

1. In a lubricating system including devices for shutting off flow to points to be lubricated after discharge of some oil to each thereof, a pump including a cylinder, a manually operable piston therein, trip-mechanism associated with said piston for retaining it at the end of its discharge stroke, a spring operatively associated with said piston for returning it to normal position, a fluid pressure responsive spring-held member associated with said cylinder for receiving oil discharged from the latter in excess of the volume fed to the points to be lubricated, a relief port permitting resisted discharge of said surplus oil responsively to pressure exerted by said spring-held member, and means associated with the latter for tripping said mechanism upon discharge of said surplus oil.

2. In a lubricating system of the type described, a pump including two cylinders, one thereof constituting the pump cylinder and having a piston spring urged on its suction stroke and manually urged on its pressure stroke, the other cylinder having a piston spring urged on its pressure stroke and arranged for movement against its spring by oil under pressure discharged from the pump cylinder in excess of discharge to bearings, trip-mechanism associated with the pump piston to hold the same at the end of its discharge stroke, and means associated with the other piston for tripping said mechanism as the surplus oil is discharged from the other cylinder.

3. In a lubricating system of the type specified, a reciprocable piston pump adapted to discharge an excess of oil at each pressure stroke, trip mechanism for holding the piston at the end of its pressure stroke, a spring operatively arranged to restore said piston to normal position, a restricted port permitting slow escape of excess oil, spring-held fluid pressure responsive means associated with the pump for initially receiving said excess oil and maintaining the same under pressure for effecting discharge thereof, and a member operatively associated with said means for tripping said mechanism upon completion of discharge of said surplus oil.

4. In a lubricating system of the type specified, a reciprocable piston pump adapted to discharge an excess of oil at each pressure stroke, trip-mechanism for holding the piston at the end of its pressure stroke, a spring operatively arranged to restore said piston to normal position, a restricted port permitting slow escape of excess oil, a cylinder, a piston therein, a spring normally maintaining said piston at the discharge end of said cylinder, connection between said pump and said cylinder for causing excess oil to be initially forced into the latter to thereby permit maintenance of pressure on the oil to effect discharge thereof while the pump piston is inert, and means operatively associated with said second piston for tripping said mechanism upon completing discharge of said surplus oil.

5. In a lubricating system of the type specified, a reciprocable piston pump adapted to discharge an excess of oil at each pressure stroke, trip-mechanism for holding the piston at the end of its pressure stroke, a spring operatively arranged to restore said piston to normal position, a filter plug arranged above the outlet from the pump for permitting escape of air and excess oil, spring-held fluid pressure responsive means associated with the pump for initially receiving said excess oil and maintaining the same under pressure for effecting discharge thereof, and a member operatively associated with said means for tripping said mechanism upon completion of discharge of said surplus oil.

6. In a lubricating system of the type specified, a reciprocable piston pump adapted to discharge an excess of oil at each pressure stroke, trip-mechanism for holding the piston at the end of its pressure stroke, a spring operatively arranged to restore said piston to normal position, a filter plug arranged above the outlet from the pump for permitting escape of air and excess oil, a cylinder, a piston therein, a spring normally maintaining said piston at the discharge end of said cylinder, connection between said pump and said cylinder for causing excess oil to be initially forced into the latter to thereby permit maintenance of pressure on the oil to effect discharge thereof while the pump piston is inert, and means operatively associated with said second piston for tripping said mechanism upon completing discharge of said surplus oil.

7. In a lubricating system of the type specified, a reciprocable piston pump adapted to discharge an excess of oil at each pressure stroke, a trip-mechanism for holding the piston at the end of its pressure stroke, a spring operatively arranged to restore said piston to normal position, a restricted port permitting slow escape of excess oil, a cylinder, a piston therein, a spring normally maintaining said piston at the discharge end of said cylinder, connection between said pump and said cylinder for causing excess oil to be initially forced into the latter to thereby permit maintenance of pressure on the oil to effect discharge thereof while the pump piston is inert, a hollow stem for said piston, there being an opening in the latter communicating with said stem, a filter plug disposed to permit slow flow of air and oil through said stem, and a member carried by said stem for tripping said mechanism following discharge of excess fluid.

8. In a lubricating system of the type specified, a reciprocable piston pump adapted to discharge an excess of oil at each pressure stroke, trip-mechanism for holding the piston at the end of its pressure stroke, a spring operatively arranged to restore said piston to normal position, a restricted port permitting slow escape of excess oil, a cylinder arranged with its discharge end disposed at a higher elevation than the outlet to the piping fed by said pump, a piston therein, a spring normally maintaining said piston at the discharge end of said cylinder, connection between said pump and said cylinder for causing excess oil to be initially forced into the latter to thereby permit maintenance of pressure on the oil to effect discharge thereof while the pump piston is inert, a hollow stem for said piston, there being an opening in the latter communicating with said stem, a filter plug disposed to permit slow flow of air and oil through said stem, and a member carried by said stem for tripping said mechanism following discharge of excess fluid.

IRVING COWLES.